(12) United States Patent
Hubmer et al.

(10) Patent No.: US 7,570,168 B2
(45) Date of Patent: Aug. 4, 2009

(54) ANTENNA FOR COMMUNICATION WITH A MULTITUDE OF TRANSPONDERS

(75) Inventors: Paul Hubmer, Hart-Purgstall (AT); Christian Schwar, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 11/632,733

(22) PCT Filed: Jul. 13, 2005

(86) PCT No.: PCT/IB2005/052326

§ 371 (c)(1),
(2), (4) Date: Nov. 21, 2007

(87) PCT Pub. No.: WO2006/008705

PCT Pub. Date: Jan. 26, 2006

(65) Prior Publication Data

US 2008/0169985 A1 Jul. 17, 2008

(30) Foreign Application Priority Data

Jul. 16, 2004 (EP) .................................. 04103406

(51) Int. Cl.
*G08B 13/14* (2006.01)
*H01Q 11/12* (2006.01)
*H01Q 21/00* (2006.01)

(52) U.S. Cl. ...................... 340/572.1; 343/742; 343/867
(58) Field of Classification Search ................. 343/741, 343/742, 867; 340/572.1
See application file for complete search history.

(56) References Cited

U.S. PATENT DOCUMENTS 6,814,284 B2 * 11/2004 Ehlers et al. ................. 235/383

FOREIGN PATENT DOCUMENTS

JP 2003 142927 5/2003

* cited by examiner

*Primary Examiner*—Shih-Chao Chen

(57) ABSTRACT

An antenna (1) for communication with a multitude of transponders (6a . . . 6c) is provided, the antenna (1) having an antenna conductor (2) which completely encloses at least one read/write region (4c) intended for a transponder (6c) individually and/or, when a multitude of read/write regions (4a, 4b) are arranged within a continuous inner region (3) enclosed by the antenna conductor (2), the inner region (3) has constrictions (5a) between the read/write regions (4a, 4b) so that the antenna conductor (2) largely encloses these read/write regions (4a, 4b) individually. The electromagnetic field radiated by the antenna (1) is thereby concentrated on the read/write regions (4a . . . 4c).

25 Claims, 8 Drawing Sheets

ANTENNA FOR COMMUNICATION WITH A MULTITUDE OF TRANSPONDERS

FIELD OF THE INVENTION

The invention relates to an antenna for communication with a multitude of transponders, in particular with a multitude of so-called radio-frequency identification tags, abbreviated to RFID tags, the antenna having an antenna conductor, which encloses a multitude of read/write regions intended for transponders.

The invention also relates to a communication system having an antenna according to the invention, and to a use of an antenna according to the invention or of such a communication station.

BACKGROUND OF THE INVENTION

Said RFID tags are known from the prior art, and are generally used to store data or for object identification. For example, consumer articles are equipped with such tags in order to electronically reveal the price, ingredients, instructions for use and the like in a simple way. The invention therefore relates generally to data carriers which can be written to and read from wirelessly.

The aforementioned RFID tags are in general comparatively small, and are adhesively bonded onto an object or are directly contained in it. With the aid of an antenna which is usually integrated in the RFID tag, it is possible to communicate with a communication station, a so-called "reader". Distinction is also generally made between active and passive RFID tags, passive RFID tags not having their own current or energy supply. In this case, with the aid of the integrated antenna, the RFID tag is supplied with energy which is drawn from the electromagnetic field radiated by the communication station or transceiving device. In this way, it is possible to read data from a passive transponder or write data to it.

In order to achieve an adequate energy supply for the aforementioned transponder, however, the antenna of the communication station must provide a correspondingly strong field. There are furthermore systems in which a multiplicity of such transponders, or objects provided with such transponders, are arranged in a very narrow space so that, according to the position of the transponders and/or objects provided with them, the antenna of the communication system must also be matched to the position of the transponders.

In order to pick up a multiplicity of transponders simultaneously, according to the state of the art it is also possible to use a common antenna. Normally, the antenna then simply envelops the read/write regions for the transponders. Owing to the larger dimensions of an antenna for a multitude of transponders compared with an antenna for a single transponder, however, the field strength in areas further away from the antenna conductor decreases strongly so that communication between the communication station and the transponders is not possible there, or is possible only to a limited extent.

The aforementioned problem also arises in the event that a multiplicity of transponders are arranged essentially along a line, with a corresponding design of an antenna having a length-to-width ratio of much more than 1. The mutually parallel antenna conductor sections which extend in the longitudinal direction primarily contribute to the formation of the field in this case, and the antenna conductor sections extending transversely thereto in the width direction contribute less. With such an antenna, therefore, it must also be assumed that there is not an adequately strong electromagnetic field in the central region to offer an adequate energy supply for normal transponders when complying with conventional spacings.

In the case of antennas for a multitude of transponders, it is therefore necessary to ensure either that a stronger energy supply is applied to the antenna, which in turn entails larger conductor cross sections, or that the transponders or products equipped with them are placed closer to the antenna. However, any reduction of the distance between the antenna and the transponder is often restricted by design conditions, when such transponders are integrated in a product equipped with them.

In order to achieve sufficiently large fields, as an alternative, a multiplicity of antennas may for example be arranged in a row or line form corresponding to the number of transponder positions, although such a structure is disadvantageous owing to the increased multiplicity of terminals and supply or connection lines to the individual antennas, and entails increased cost and design outlay.

OBJECT AND SUMMARY OF THE INVENTION

It is therefore on object of the present invention to provide an antenna for communication with a multitude of transponders, and a communication station having said antenna, in which the aforementioned disadvantages are overcome.

In order to achieve the aforementioned objects, the invention relates to an antenna of the type mentioned in the first paragraph, wherein the antenna conductor completely encloses at least two read/write regions individually, or wherein the antenna conductor encloses a continuous inner region which has constrictions between a multitude of read/write regions contained in it, so that the antenna conductor largely encloses at least two read/write regions individually, or wherein the antenna conductor completely encloses at least one read/write region individually and also encloses a continuous inner region which has constrictions between a multitude of read/write regions contained in it, so that the antenna conductor largely encloses at least two read/write regions individually.

The effect achieved by the features according to the invention is that the electromagnetic field in said read/write regions is concentrated with a single antenna. This can substantially improve the communication between the communication station and transponders.

In the case of elongated antennas, besides the subregions of the antenna conductor sections extending in the direction of the largest dimension of the antenna, inserted antenna conductor sections extending transversely thereto also contribute to the formation of the antenna field so that, overall, an adequately large electromagnetic field can be produced even with low power in order to provide an adequate energy supply in the transponders for sending data.

It is therefore possible to provide an adequately high electromagnetic field without increasing the power to be sent to the antenna. The antenna configuration proposed according to the invention therefore makes it possible to provide a larger distance between the antenna and the transponders according to predetermined requirements of structural conditions.

With the antenna according to the invention, data can furthermore be picked up simultaneously from a multiplicity of transponders, or products equipped with transponders, which are for example arranged in a row or line or column form. It is therefore possible to make do with a single antenna having simplified supply or connection lines. Furthermore, even if there is a sizeable distance between the antenna and the data media, or the products equipped with the data media, reliable acquisition of data can be achieved by providing an adequate field to generate energy in the data media.

It is advantageous for the enveloping angle of the antenna conductor to be more than 360 degrees in the case of a fully enclosed read/write region. A particularly strong electromagnetic field can thereby be achieved in the vicinity of a read/write region.

An advantageous embodiment of the invention is also provided by an antenna in which the antenna conductor encircles adjacent read/write regions in opposite directional senses. This arrangement is particularly suitable when the individual read/write regions have only a small spacing from one another. This is because if tightly adjacent read/write regions are encircled in the same directional sense, then—since sections of the antenna conductor carrying current in opposite directional senses are close together—cancellation or least attenuation phenomena of the electromagnetic field will occur. Furthermore, the material outlay for the aforementioned arrangement is comparatively small.

In the case of a multitude of read/write regions within a continuous inner region, it is advantageous for the ratio of the maximum circle circumscribed for a read/write region in the inner region to the minimum circle circumscribed for a constriction in the inner region to be at least 1.5. Indeed, with these ratios the effect according to the invention of concentrating the electromagnetic field on a read/write region becomes particularly well visible.

It is also advantageous for the center spacing of two maximum circles, which are circumscribed for adjacent read/write regions in the inner region and which have a minimum spacing from each other, to correspond to at least 1.5 times the sum of their radii. In this way, antenna conductor sections extending transversely to the longitudinal dimension of an antenna have an adequately large spacing, so that the electromagnetic fields produced by said conductor sections substantially do not affect one another owing to the small conductor spacing.

It is furthermore advantageous for the read/write regions to lie respectively in mutually parallel planes or in a single plane and for the antenna conductor likewise to be laid out in the respective plane of a read/write region. Especially when it has read/write regions arranged in the form of a matrix, for example, such an antenna is particularly suitable for a display shelf or a vending machine, in which objects to be identified are stored. The antenna may in this case be applied to the rear side of the display shelf.

It is also advantageous for the read/write regions to lie on a geometrical surface and for the antenna conductor likewise to be laid out on this surface. Objects which need not necessarily lie on a plane may also be equipped with a multitude of RFID tags. One example is a cuboid packet which has RFID tags for two different delivery services on two different cuboid surfaces. A geometrically curved antenna is advantageous in order to be able to communicate reliably even with such a configuration of RFID tags.

It is also particularly advantageous for a read/write region to be configured so that an antenna of a transponder can be arranged fully within this read/write region, because the coupling between the antenna of the transceiving unit and an antenna of the transponder is particularly strong in here.

It is particularly advantageous for the read/write regions also to be configured so that a multitude of objects equipped with a transponder can each be arranged fully within a respective read/write region. Transponders are generally smaller than the products equipped with them. It may therefore be expedient to adapt the antenna to the size of the objects, for instance when it is not possible to see from a product exactly where an RFID tag is located.

It is advantageous for at most two regions with constrictions to adjoin a read/write region, and vice versa, not counting any constriction or read/write region which adjoins a position of the inner region not enclosed by the antenna conductor. This is because the antenna as indicated, which has essentially one-dimensional direction, is particularly easy to produce. Essentially straight antennas are particularly preferable, although for example curved embodiments are also possible.

It is also advantageous for at least one constriction to adjoin more than two read/write regions and/or vice versa, not counting any constriction or read/write region which adjoins a position of the inner region not enclosed by the antenna conductor. The antenna as indicated, which has branchings, is suitable for arrangements in which the read/write positions do not lie essentially on a line. Arrangements in the form of a matrix, in particular, are therefore also possible.

The object according to the invention is also achieved by a communication station for communication with a multitude of transponders, comprising at least one antenna, a supply device for supplying the antenna with electric power, and an evaluation unit which is coupled to the antenna.

In accordance with the invention, use of an antenna according to the invention and/or a communication station according to the invention is provided, especially in a display shelf, in particular a retail display shelf, in items of practical use, for example printers, storages for holding data media or the like, or vending machines etc. For such applications, as indicated above, it is often necessary to permit data interrogation of a multitude of data media, or products provided with them, arranged in a row or column.

When used in a display shelf, in particular a retail display shelf, for example, such data interrogation may be used for inventorying. As an alternative, for example, when detecting that a product provided with a data carrier has been removed from a display shelf, it is possible to make additional information available on a display screen placed next to the retail display shelf.

When used in items of practical use, for example printers, the frequency of use or length of use of individual printer cartridges may for example be monitored according to the position of individual printer cartridges which are equipped with data media, and information relating to the filling level of such a printer cartridge can be made available.

When used in vending machines, there are likewise opportunities for inventorying or automatic removal of desired products.

These and other aspects of the invention are apparent from and will be elucidated with reference to the embodiments described hereinafter, to which however the invention is not limited.

DESCRIPTION OF EMBODIMENTS

Figure 1A:
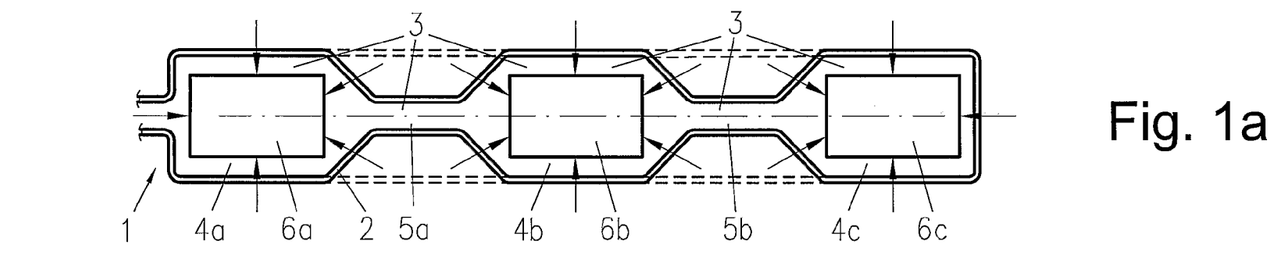
FIGS. 1a-1c show an antenna in which a multitude of read/write regions are arranged within a continuous inner region enclosed by the antenna conductor.

FIG. 1a shows an antenna 1 having an antenna conductor 2 for communication with a multitude of transponders 6a . . . 6c, which to this end comprises three read/write regions 4a . . . 4c disposed along a straight line. The antenna conductor 2 encloses a continuous inner region 3, which has constrictions 5a . . . 5b between the read/write regions 4a . . . 4c. For comparison, a broken line represents an arrangement according to the prior art which does not have any constrictions 5a . . . 5b. The effect achieved by providing the constrictions 5a . . . 5b is now that the antenna conductor 2 largely encloses each read/write region 4a . . . 4c. Both the read/write regions 4a . . . 4c and the constrictions 5a . . . 5b are in this case formed by mutually opposite parallel sections of the antenna conductor 2, which are respectively connected by obliquely extending sections. Compared with a configuration according to the prior art, the electromagnetic field strength in the read/write regions 4a . . . 4c is greater for the antenna 1 with constrictions 5a . . . 5b, but the inductance is lower. The effect of the electromagnetic field is indicated in FIG. 1a by arrows, which point from the respective section of the antenna conductor 2 to a transponder 6a . . . 6c.

Figure 1B:
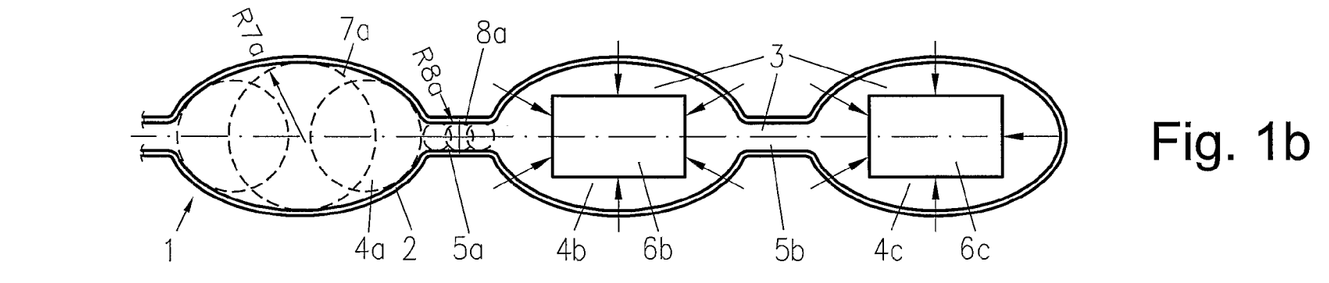

FIG. 1b shows an antenna 1 similar to that shown in FIG. 1a, in which read/write regions 4a . . . 4c are formed by mutually opposite elliptically shaped sections of the antenna conductor 2, and the constrictions 5a . . . 5b are formed by mutually opposite parallel sections of the antenna conductor 2. Also represented are the maximum circumscribable circle 7a for the read/write region 4a in the inner region 3 and the minimum circumscribable circle 8a for the constriction 5a in the inner region 3. FIG. 1b clearly demonstrates that the ratio of the radius R7a of the maximum circle 7a to the radius R8a of the minimum circle 8a is significantly more than 1.5.

Figure 1C:
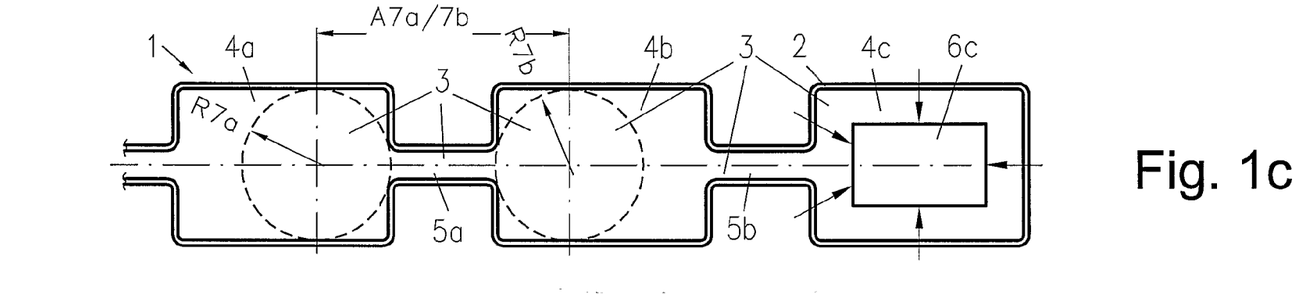
Figure 2A:
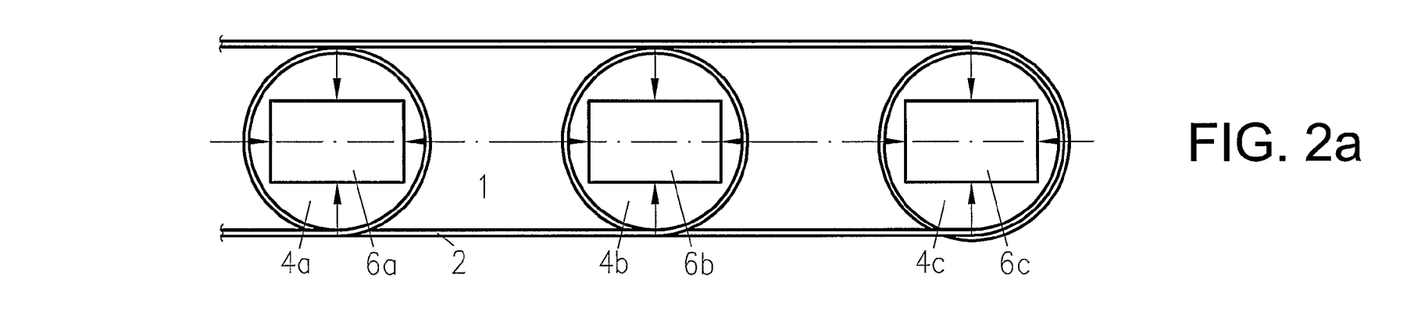
FIGS. 2a-2d show an antenna in which the antenna conductor completely encloses a multitude of read/write regions individually.

FIG. 1c shows another embodiment of an antenna 1 according to the invention. In this case, the read/write regions 4a . . . 4c and the constrictions 5a . . . 5b are formed by mutually opposite parallel sections of the antenna conductor 2 as in FIG. 1a, although these are connected by sections extending perpendicularly to them. Also represented in FIG. 1c are the maximum circumscribable circle 7a for the read/write region 4a in the inner region 3 and maximum circumscribable circle 7b for the read/write region 4b in the inner region 3. The two circles 7a and 7b in this case have a minimal spacing from each other. FIG. 1c thus clearly demonstrates that the center spacing A7a/7b of the two circles 7a and 7b is more than 1.5 times the sum of their radii R7a, R7b:

FIG. 2a also shows an antenna 1 with an antenna conductor 2 for communication with a multitude of transponders 6a . . . 6c, which in this case comprises three read/write regions 4a . . . 4c disposed along a straight line, but in which the antenna conductor 2 completely encloses each read/write region 4a . . . 4c individually. To this end, the antenna conductor 2 has loops enclosing the read/write regions 4a . . . 4c. Here as well, the electromagnetic field strength in the read/write regions 4a . . . 4c is greater than in a configuration according to the prior art. The effect of the electromagnetic field is again indicated by arrows, which point from the respective section of the antenna conductor 2 to a transponder 6a . . . 6c. Owing to the greater enveloping angle of the antenna conductor 2, the concentration of the electromagnetic field on the read/write regions 4a . . . 4c is even greater than in the embodiments represented in FIGS. 1a . . . 1c. In the third read/write region 4c, the enveloping angle even has a value of 540 degrees. In FIG. 2a, of the overlap of the outer conductor 2 at the third read/write region 4c is represented as lying in a plane. Naturally, it is also conceivable for the corresponding sections of the outer conductor 2 to lie above one another.

Figure 2B:
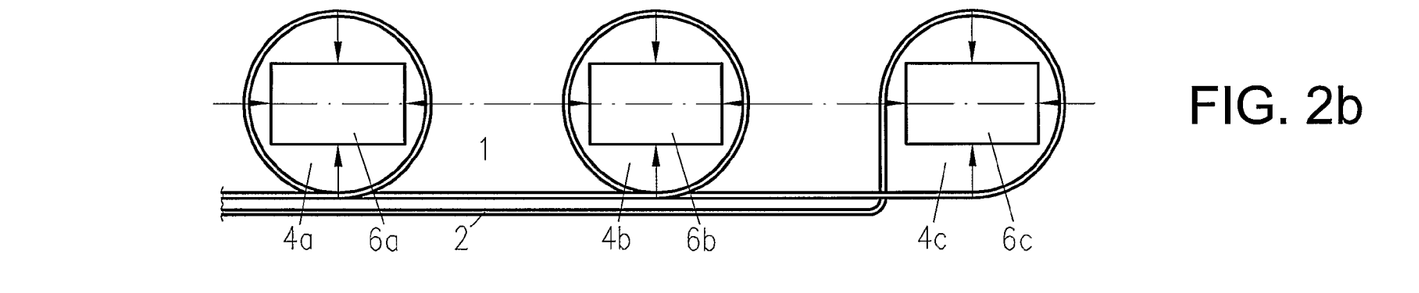

FIG. 2b shows an antenna 1 according to FIG. 2a, but in which the spacing between the linearly extending and mutually parallel sections of the antenna conductor 2, which pass respectively between the read/write regions 4a . . . 4c, is smaller than in FIG. 2a. The electromagnetic field is thereby concentrated even better on the read/write regions 4a . . . 4c and the inductance of the antenna 1 is reduced. This is because the electromagnetic field is substantially cancelled on the linearly extending and mutually parallel sections of the antenna conductor 2 because of the oppositely directed current flows.

Figure 2C:
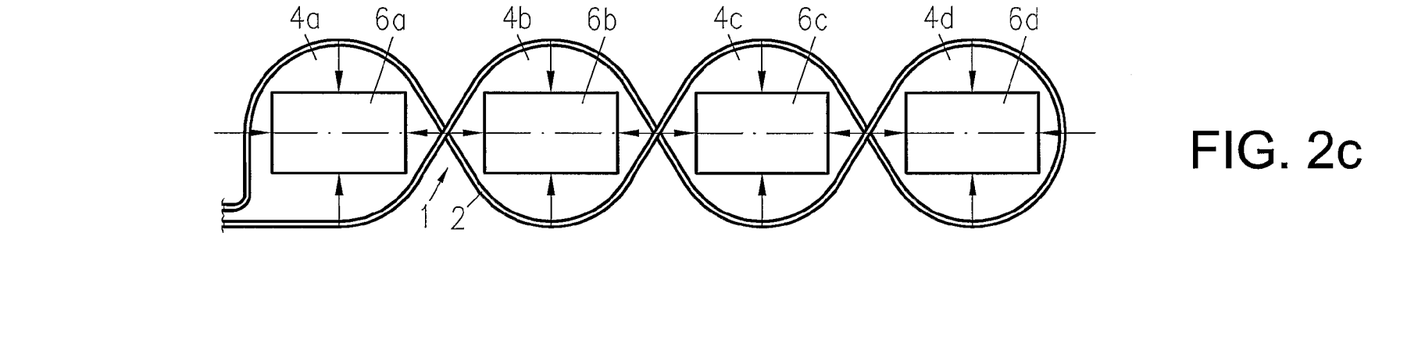

FIG. 2c shows another preferred embodiment of the antenna 2, in which the antenna conductor 2 is twisted to a certain extent and includes the read/write regions 4a . . . 4c between the respective crossover points. The effect of the antenna 1 as shown is similar to the variant represented in FIG. 2b, although the material outlay for the antenna 1 is somewhat less here.

Figure 2D:
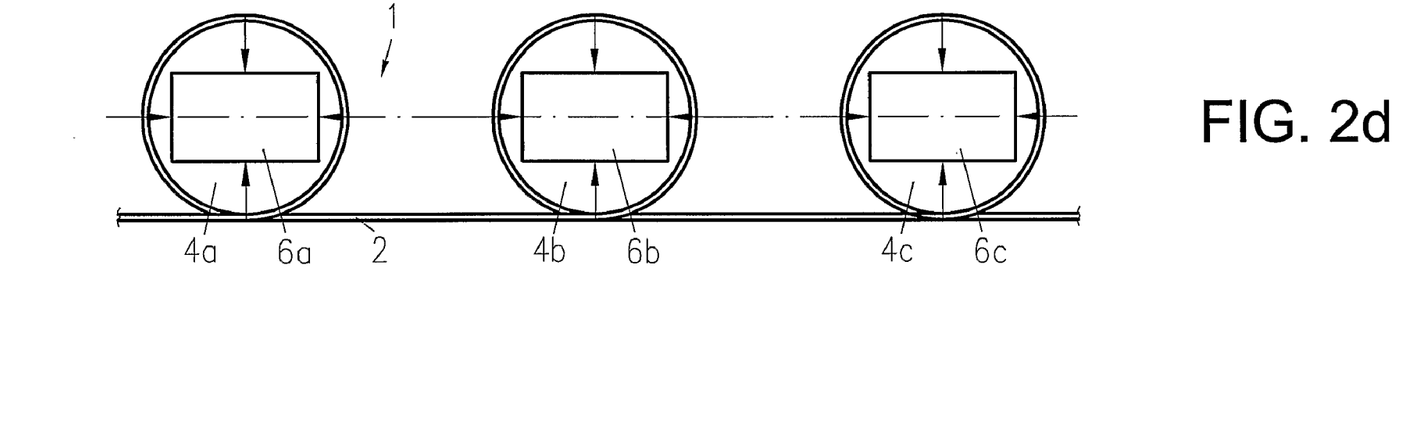

FIG. 2d lastly shows an antenna 1 for a communication station 9, in which the two terminals of the antenna 1 are physically separated. The antenna conductor 2 forms single loops, which respectively include the read/write regions 4a . . . 4c individually. Although the read/write regions 4a . . . 4c are in this case arranged on a straight line, other configurations are also possible of course.

Figure 3:
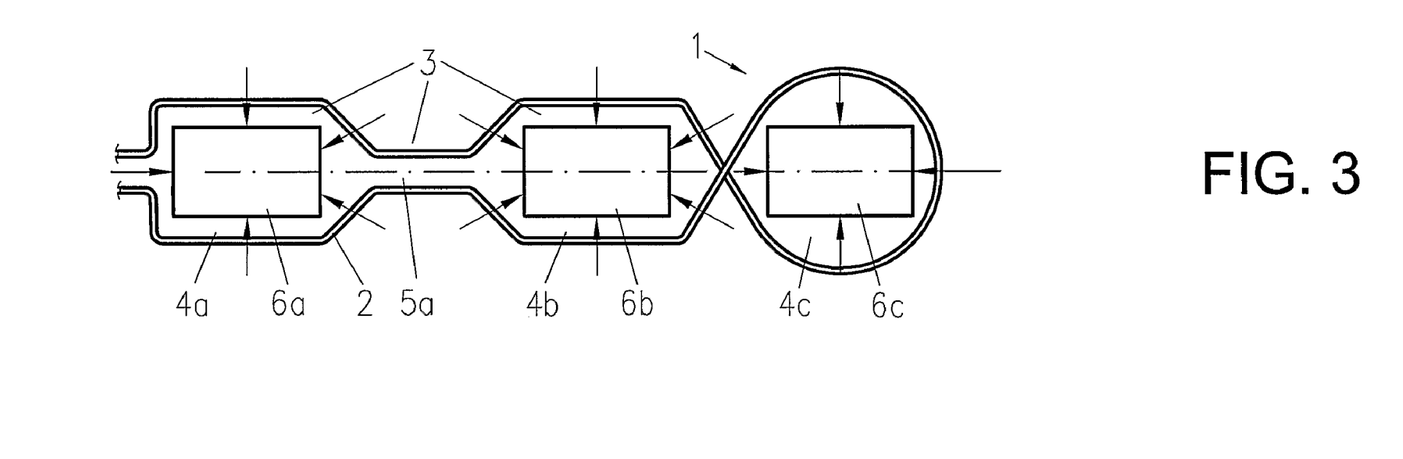
FIG. 3 shows an antenna which has a combined form of FIG. 1a and FIG. 2c.

FIG. 3 lastly shows an antenna 1 in which the forms of FIG. 1a and FIG. 2c are combined. The antenna conductor 2 in this case fully encloses both a continuous inner region 3, which has a constriction 5a between the read/write regions 4a . . . 4b, and also the read/write region 4c. The effect of the antenna 1 on the respective sections is similar to the effects described in FIG. 1a and FIG. 2c. At this point, it should be mentioned that FIG. 3 is only intended to illustrate the possibility of combining the forms already mentioned and the invention is in no way limited to the specifically shown combination. Rather, all conceivable combinations fall within the broad scope of the invention. This also applies, in particular, to the embodiments represented in FIGS. 4a, 4b and 5.

Figure 4A:
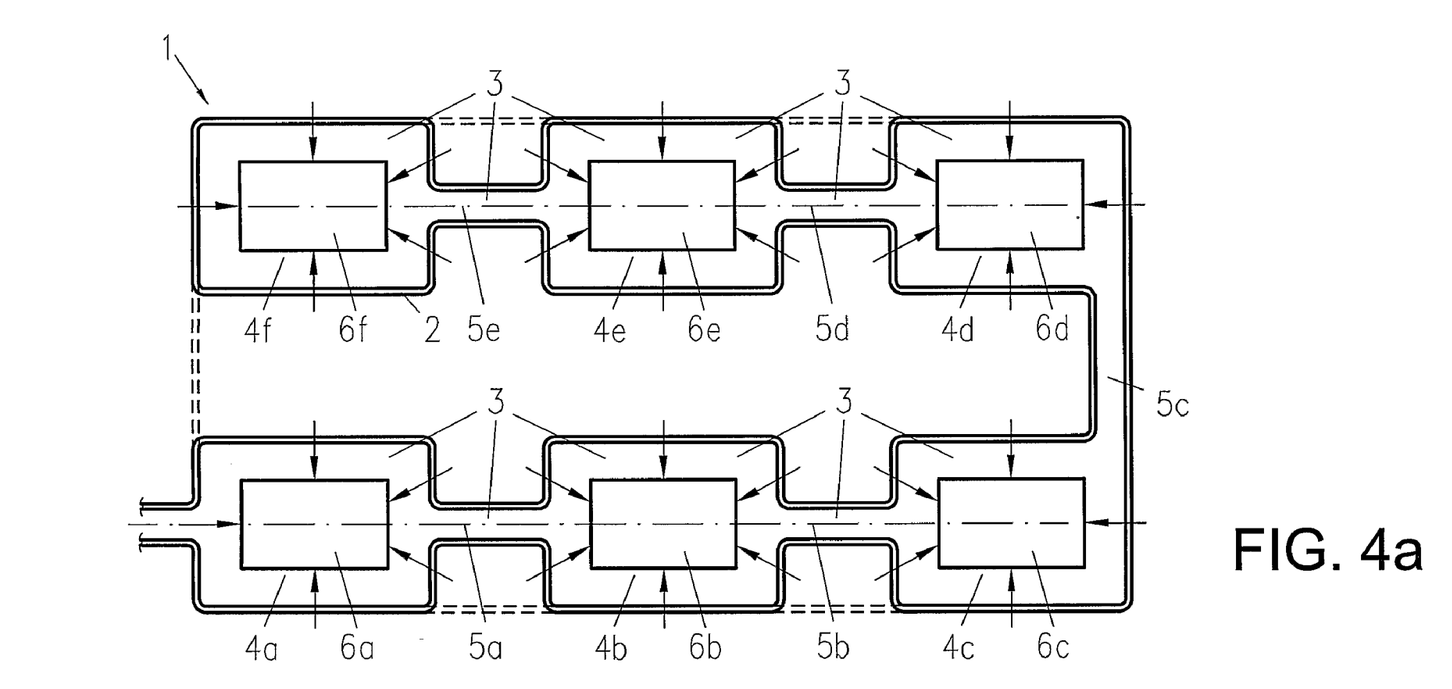
FIG. 4a shows an antenna according to FIG. 1c in which the read/write regions are arranged in the form of a matrix.

FIG. 4a shows an antenna according to FIG. 1c, but in which the read/write regions 4a . . . 4f are arranged in the form of a matrix. Here, the first three read/write regions 4a . . . 4c lie in a first line and the second three read/write regions 4d . . . 4f lie in a second line. The effect of the antenna 1 is in this case similar to the antenna 1 shown in FIG. 1c. A broken line again represents a configuration according to the prior art. The antenna conductor 2 essentially forms the envelope of the read/write regions 4a . . . 4f. Compared with an arrangement according to the prior art, the electromagnetic field is here again concentrated in the read/write regions 4a . . . 4f.

Figure 4B:
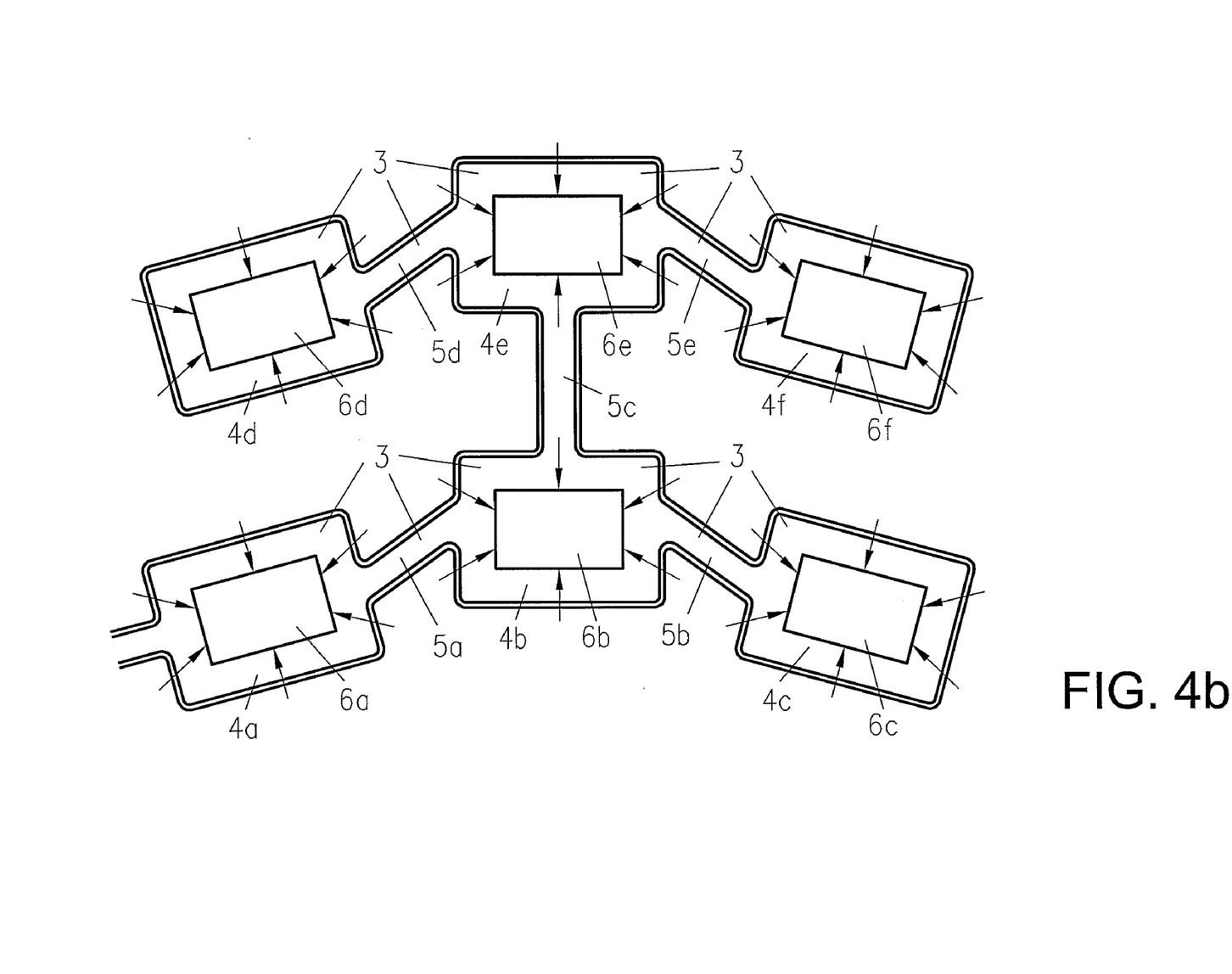
FIG. 4b shows an antenna according to FIG. 4a, in which the read/write regions are arranged not exactly in the form of a matrix.

FIG. 4b furthermore shows an antenna 1 according to FIG. 4a, in which the read/write regions 4a . . . 4f are arranged not exactly in the form of a matrix but deviate from the strict line/column form. Furthermore, the read/write regions 4a . . .

4f are in this case connected not in the form of a chain as in FIG. 4a but via bifurcations. The effect of the antenna 1 is, however, similar to the antenna 1 shown in FIG. 4a.

Figure 5:
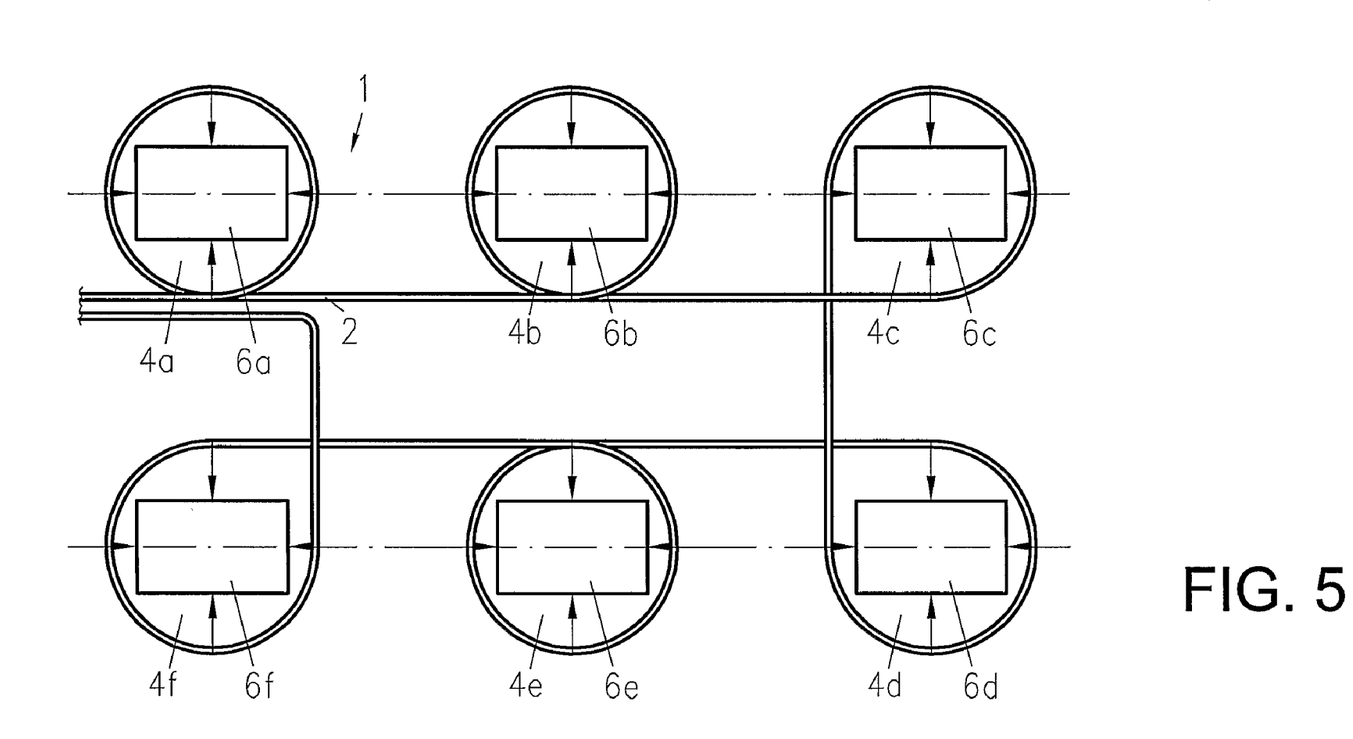
FIG. 5 shows an antenna according to FIG. 2b in which the read/write regions are arranged in the form of a matrix.

FIG. 5 lastly shows an antenna according to FIG. 2b, in which the read/write regions 4a . . . 4f are likewise arranged in the form of a matrix and are again connected in the form of a chain by the antenna conductor 2. The antenna 1 according to FIG. 2b is in this case reflected through a horizontal axis. In FIG. 5, therefore, the antenna conductor 2 circumscribes a region between the individual lines of the read/write regions 4a . . . 4f, which leads to an actually undesirable electromagnetic field in this region. This, however, can readily be prevented by simply duplicating rather than mirroring the form represented in FIG. 2b, in which case appropriate connecting sections of the antenna conductor 2 need to be provided at the left-hand edge. However, increased material outlay is then required in this variant.

Figure 6:
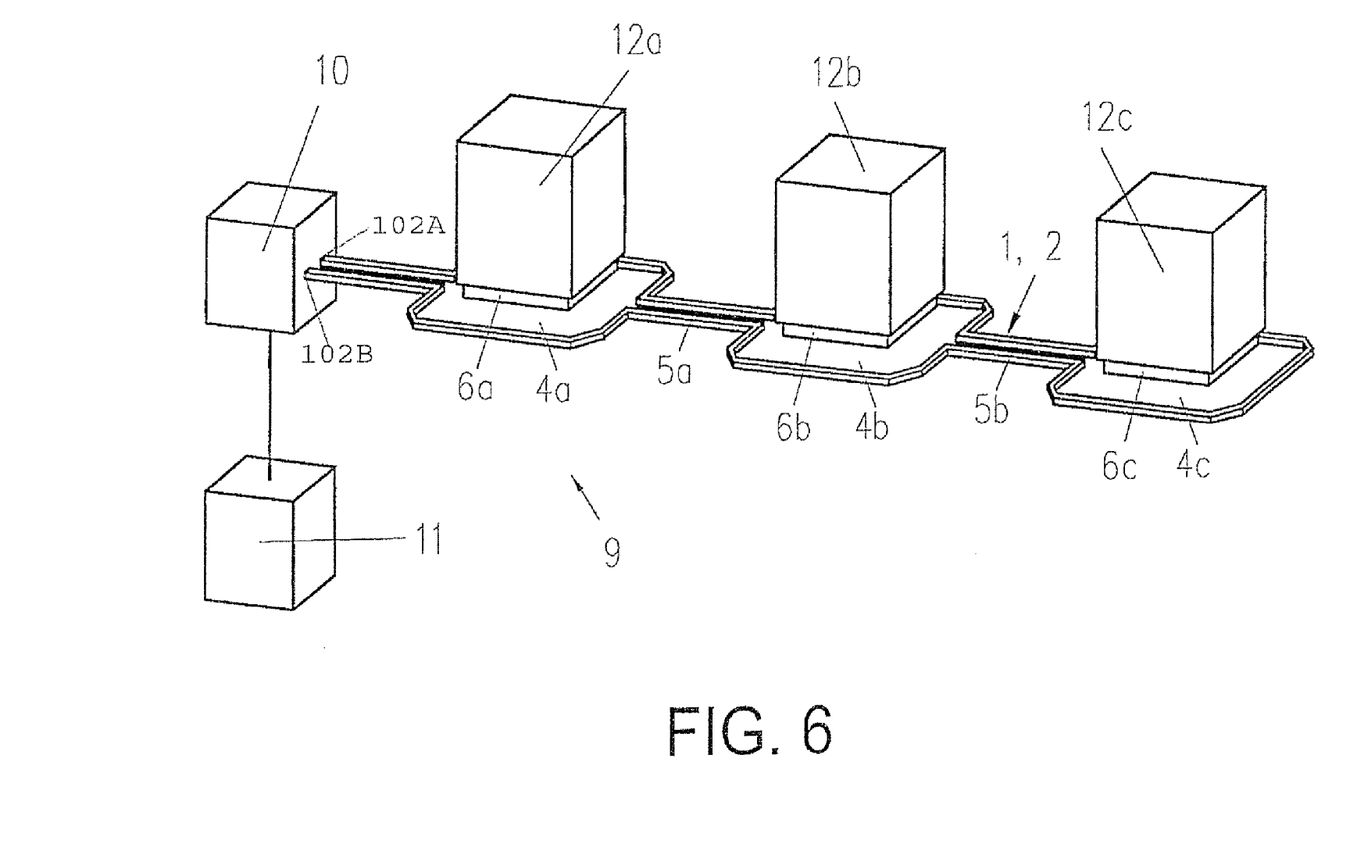
FIG. 6 shows a communication station for communication with a multitude of transponders.

FIG. 6 now shows a communication station 9 for communication with a multitude of transponders 6a . . . 6c which are fitted to objects 12a . . . 12c. The communication station 9 comprises an antenna 1 with an antenna conductor 2, a supply device 10 connected to the antenna conductor ends 102A, 102B for supplying the antenna 1 with electric power, and an evaluation unit 11 which is coupled to the antenna 1. It can be seen clearly that the read/write regions 4a . . . 4c lie in a single plane, in which the antenna conductor 2 is also laid out. It can also be seen that the read/write regions 4a . . . 4c are configured so that the transponders 6a . . . 6c and therefore their antenna can each simultaneously be arranged fully within their respective read/write region 4a . . . 4c. In the arrangement represented, even the objects 12a . . . 12c themselves can each be arranged within a respective read/write region 4a . . . 4c.

Figure 7:
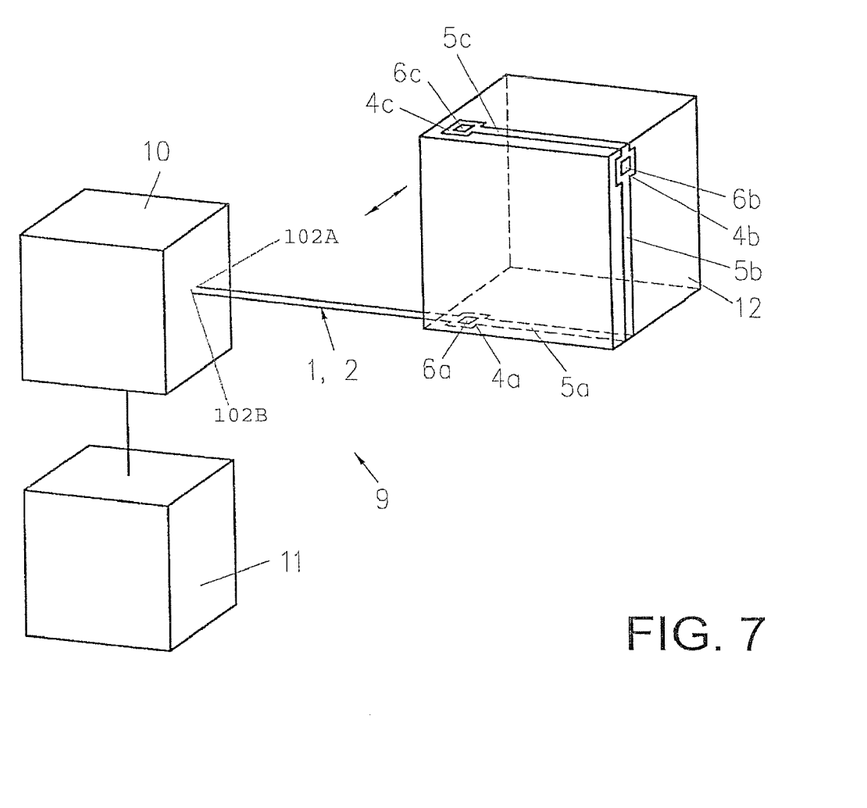
FIG. 7 shows a communication station in which the read/write regions are arranged on a geometrical surface.

FIG. 7 lastly shows a communication station 9 in which the read/write regions 4a . . . 4c are arranged on a geometrical surface, the antenna conductor 2 likewise being laid out in this surface. This is necessary here since the cubic objects 12 have three transponders 6a . . . 6c, each on a different side. It is, however, conceivable for the object 12 to have only one transponder 6a, which is intended to be read by the communication station 9 even when the object 12 is in different spatial positions. The double arrow here symbolizes a possible transport direction of the object 12. Merely for illustration, it should be mentioned here that the object 12 may be a package or an item of luggage which is delivered to the communication station 9 in a transport direction with the aid of a conveyor belt (not shown). The communication station 9 may then be part of a sorting machine, for example at the mail office for the aforementioned package or at the airport for the aforementioned items of luggage.

Lastly, it will be mentioned that it is of course not absolutely necessary for the antenna conductor 2 to be formed in a single piece. Rather, it may naturally also be made of a multitude of individual parts. With an appropriate design, an antenna 1 may thus consist of a multitude of similar modules which can be manufactured efficiently.

It will also be mentioned that the features according to the invention may be used individually or in any combination.

Lastly, the invention is not intended to be restricted to the represented forms of the antenna conductor 2. In particular, round or circular, rectangular or square and polygonal read/write regions 4a . . . 4f may be envisaged instead, for example in order to adapt a read/write region 4a . . . 4f to the outer shape of a transponder 6a . . . 6f, in which case a read/write region 4a . . . 4f is preferably also matched to the size of a transponder 6a . . . 6f.

Besides the various forms, in particular, multilayer loops which lie for example in one plane or above one another are also possible for the antenna 1 according to FIGS. 2a-2d, 3 and 5 in order to concentrate the electromagnetic field even more strongly on the read/write regions 4a . . . 4f. In any event, the invention achieves an increased electromagnetic field in the read/write regions 4a . . . 4f so that a smaller current is needed for the adequate supply of the transponders 6a . . . 6f in the antenna 1, compared with known antennas.

It will also be mentioned that the number of transponders 6a . . . 6f that can be read simultaneously with an antenna 1 is not restricted to the number of at most six transponders 6a . . . 6f as represented in the figures, but that the antenna 1 can be adapted according to requirements or the application.

It finally should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. An antenna for communication with a multitude of transponders, comprising:
    an antenna conductor having a first conductor end and a second conductor end, said antenna conductor extending from the first conductor end to the second conductor end, in an arrangement that encloses a multitude of read/write regions intended for transponders wherein
    a portion of the antenna conductor completely encloses a first read/write region individually and another portion of the antenna conductor at least substantially encloses a second read/write region individually.

2. The antenna of claim 1, wherein the portion of antenna conductor that encircles the first read/write region encircles said region by more than 360 degrees.

3. The antenna of claim 2, wherein the portion of said antenna conductor that encircles the second read/write region completely encircles said region by more than 360 degrees, and
    wherein said conductor is arranged such that the first read/write portion is adjacent the second read/write portion, and
    wherein the portion of the antenna conductor that completely encircles the first read/write region encircles said region in one directional sense and the portion of the antenna conductor that completely encircles the adjacent second read/write region encircles said regions in an opposite directional sense.

4. The antenna of claim 1, wherein the first and the second read/write regions respectively lie in mutually parallel planes or in a single plane and at least a portion of the antenna conductor is in the respective plane of a read/write regions.

5. The antenna of claim 1, wherein the first and the second read/write regions lie on a geometrical surface and a portion of the antenna conductor is on said geometrical surface.

6. The antenna of claim 1, wherein the antenna conductor is formed such that a given antenna of a given transponder can be arranged fully within at least one of the first and second read/write regions.

7. The antenna of claim 1, further comprising:
a supply device connected to the first end and to the second end of the conductor for supplying the antenna with electric power, and
an evaluation unit coupled to the antenna.

8. An antenna for communication with a multitude of transponders, comprising:
an antenna conductor extending in an arrangement that encloses a continuous inner region, said region having:
a first substantially enclosed read/write region,
a second substantially enclosed read write region spaced apart from said first substantially enclosed read write region, and
a constricted region connecting the first and second substantially enclosed read/write region,
wherein the constricted region is defined by two adjacently extending, spaced apart portions of the antenna conductor.

9. The antenna of claim 8, wherein the two adjacently extending, spaced apart portions of the antenna conductor extend substantially parallel to each another.

10. The antenna of claim 9, wherein the ratio of the maximum circle formable within any one of the first and the second read/write regions to the minimum circle tangentially contacting each of the two substantially parallel, spaced apart portions of the antenna conductor defining the constricted region is at least 1.5.

11. The antenna of claim 10, wherein the center spacing between the maximum circle formable within the first read/write region and the maximum circle formable within the second read/write portion has a minimum value of at least 1.5 times the sum of the respective radii of said maximum circles.

12. The antenna of claim 8, wherein the first and the second read/write regions, and the constricted region respectively lie in mutually parallel planes or in a single plane.

13. The antenna of claim 8, wherein the antenna conductor is arranged such that the first and the second read/write regions lie on a geometrical surface.

14. The antenna of claim 8, wherein the antenna conductor is formed such that a given antenna of a given transponder can be arranged fully within either of the first and second read/write regions.

15. The antenna of claim 14 further comprising:
a supply device connected to the first end and to the second end of the conductor for supplying the antenna with electric power; and
an evaluation unit coupled to the antenna.

16. The antenna of claim 8, wherein the antenna conductor has a first end and a second end, and extends from the first end to the second end.

17. An antenna for communication with a multitude of transponders, comprising:
an antenna conductor having a first conductor end and a second conductor end, said antenna conductor extending from the first conductor end to the second conductor end, in an arrangement having
a first portion that completely encloses a first read/write region individually, and
a second portion that encloses a continuous inner region spaced apart from said first read/write region, wherein said continuous inner region comprises:
a second substantially enclosed read/write region,
a third substantially enclosed read write region spaced apart from said second substantially enclosed read write region, and
a constricted region connecting the second and third substantially enclosed read/write regions,
wherein the constricted region is defined by two adjacently extending, spaced apart portions of the antenna conductor.

18. The antenna of claim 17, wherein the two adjacently extending, spaced apart portions of the antenna conductor extend substantially parallel to each another.

19. The antenna of claim 18, wherein the ratio of the maximum circle formable within any one of the second and the third read/write regions to the minimum circle tangentially contacting the two substantially parallel lengths defining the constricted region is at least 1.5.

20. The antenna of claim 19, wherein the center spacing between the maximum circle formable within the second read/write region and the maximum circle formable within the third read/write portion has a minimum value of at least 1.5 times the sum of the respective radii of said maximum circles.

21. The antenna of claim 17, wherein the first, the second and the third read/write regions, and the constricted region respectively lie in mutually parallel planes or in a single plane.

22. The antenna of claim 17, wherein the antenna conductor is arranged such that the constricted region and the first, the second, and the third read/write regions lie on a geometrical surface.

23. The antenna of claim 17, wherein the antenna conductor is formed such that a given antenna of a given transponder can be arranged fully within any of the first, second and third read/write regions.

24. The antenna of claim 17, wherein the antenna conductor has a first end and a second end, and extends from the first end to the second end.

25. The antenna of claim 24, further comprising:
a supply device connected to the first end and to the second end of the conductor for supplying the antenna with electric power; and
an evaluation unit coupled to the antenna, wherein the antenna conductor is arranged such that the constricted region and the first, the second, and the third read/write regions lie on a geometrical surface.

* * * * *